(12) United States Patent
Gao et al.

(10) Patent No.: US 9,669,999 B2
(45) Date of Patent: Jun. 6, 2017

(54) TRANSMISSION AND POSITIONING MECHANISM

(71) Applicants: SHENZHEN FUTAIHONG PRECISION INDUSTRY CO., LTD., Shenzhen (CN); FIH (HONG KONG) LIMITED, Kowloon (HK)

(72) Inventors: Jie Gao, Shenzhen (CN); Li-Chi Zhu, Shenzhen (CN); Bing Yu, Shenzhen (CN); Jian-Ping Jin, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/689,579

(22) Filed: Apr. 17, 2015

(65) Prior Publication Data

US 2016/0176643 A1 Jun. 23, 2016

(30) Foreign Application Priority Data

Dec. 17, 2014 (CN) .......................... 2014 1 0780665

(51) Int. Cl.
*B65G 23/20* (2006.01)
*B65G 23/00* (2006.01)
*B65G 23/02* (2006.01)
*B65G 17/00* (2006.01)

(52) U.S. Cl.
CPC ........... *B65G 23/20* (2013.01); *B65G 17/002* (2013.01)

(58) Field of Classification Search
None
See application file for complete search history.

(56) References Cited

U.S. PATENT DOCUMENTS

| | | | | |
|---|---|---|---|---|
| 5,388,706 A * | 2/1995 | Baldur | ...................... | B07C 5/36 209/587 |
| 5,605,221 A * | 2/1997 | Foster | ................... | B65G 25/065 198/750.5 |
| 8,602,203 B2 * | 12/2013 | Nishihara | ............ | B65G 35/066 104/172.3 |

* cited by examiner

*Primary Examiner* — Kavel Singh
(74) *Attorney, Agent, or Firm* — Steven Reiss (57) ABSTRACT

A transmission and positioning mechanism includes a guiding assembly, a driving assembly and a positioning assembly. The guiding assembly includes two sliding rails, a transmission belt, a plurality of sliding members. The sliding members are slidably disposed on the sliding rails. The positioning assembly includes a transmission rod, a positioning rod connected to the transmission rod, a positioning block sleeved on the positioning rod, a driving rod sleeved on the transmission rod. The driving rod defines a spiral slots and at least one limiting slot. The driving assembly is connected to the positioning assembly and rotates the transmission rod, the positioning rod and the driving rod, the spiral slot engages one of the plurality of the sliding members to move other sliding members to the at least one limiting slot and the positioning blocks, and the at least one limiting slot and the positioning blocks latch the sliding members.

9 Claims, 7 Drawing Sheets

76, two positioning blocks 77, and a driving rod 78. The two bearing blocks 71 are separately set on the first baseboard 111, and another two bearing blocks 71 are separately set on the second baseboard 113. The transmission rod 72 is fixed between the two neighboring bearing blocks 71 on the first baseboard 111, and the positioning rod 76 is fixed between another two neighboring bearing blocks 71 on the second baseboard 113. The transmission wheel 73 is sleeved on an end of the transmission rod 72 and is connected to the belt 35, thus the transmission rod 72 and the transmission wheel 73 can rotate with the movement of the belt 35. The sensor 74 is sleeved on the transmission rod 72 and located outside of the transmission wheel 73. The positioning rod 76 is connected to, and rotatable with the transmission rod 72 by the shaft coupling 75 to rotate simultaneously with the transmission rod 72, the positioning rod 76 extends coaxially through, and being coupled with the at least one hollow positioning block 77.

It is to be understood, the transmission rod 72 can be omitted, at this time, the transmission wheel 73 and the positioning rod 76 are connected by the driving rod 78, thus the driving rod 78 can rotate with the transmission wheel 73 to drive the positioning rod 76 to rotate simultaneously.

Figure 1:
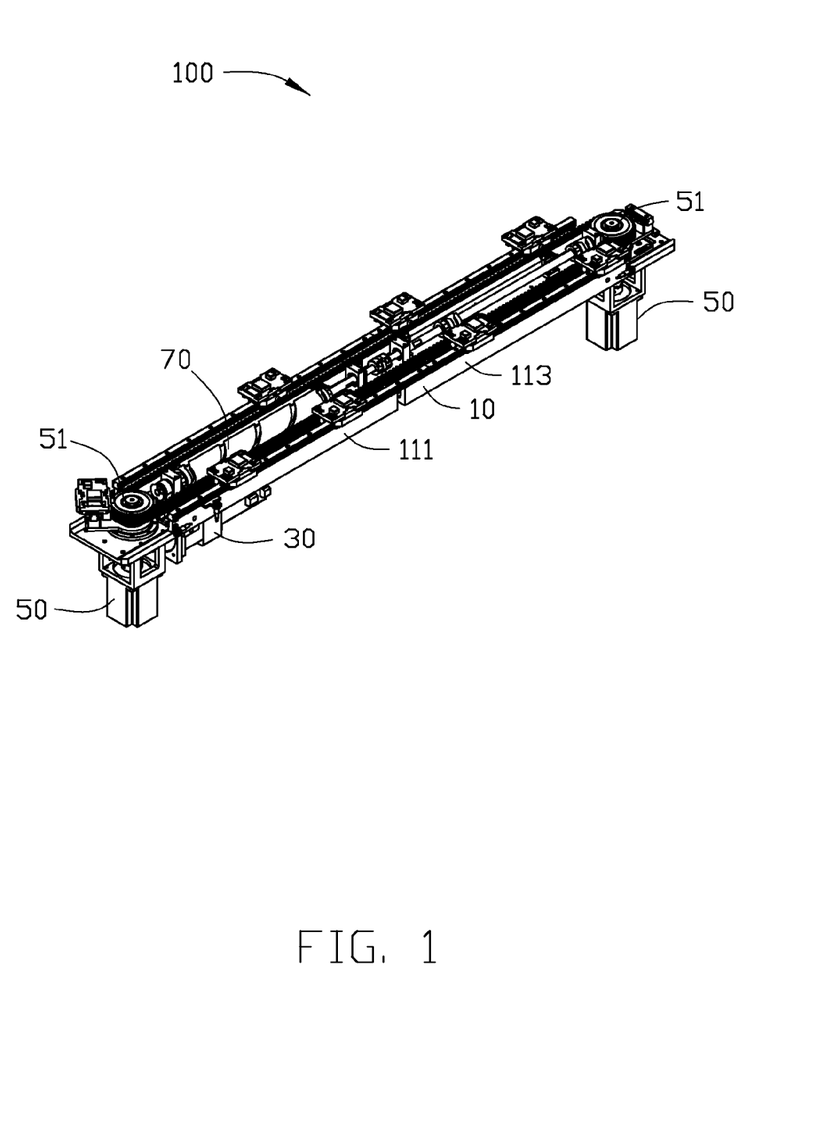
Figure 2:
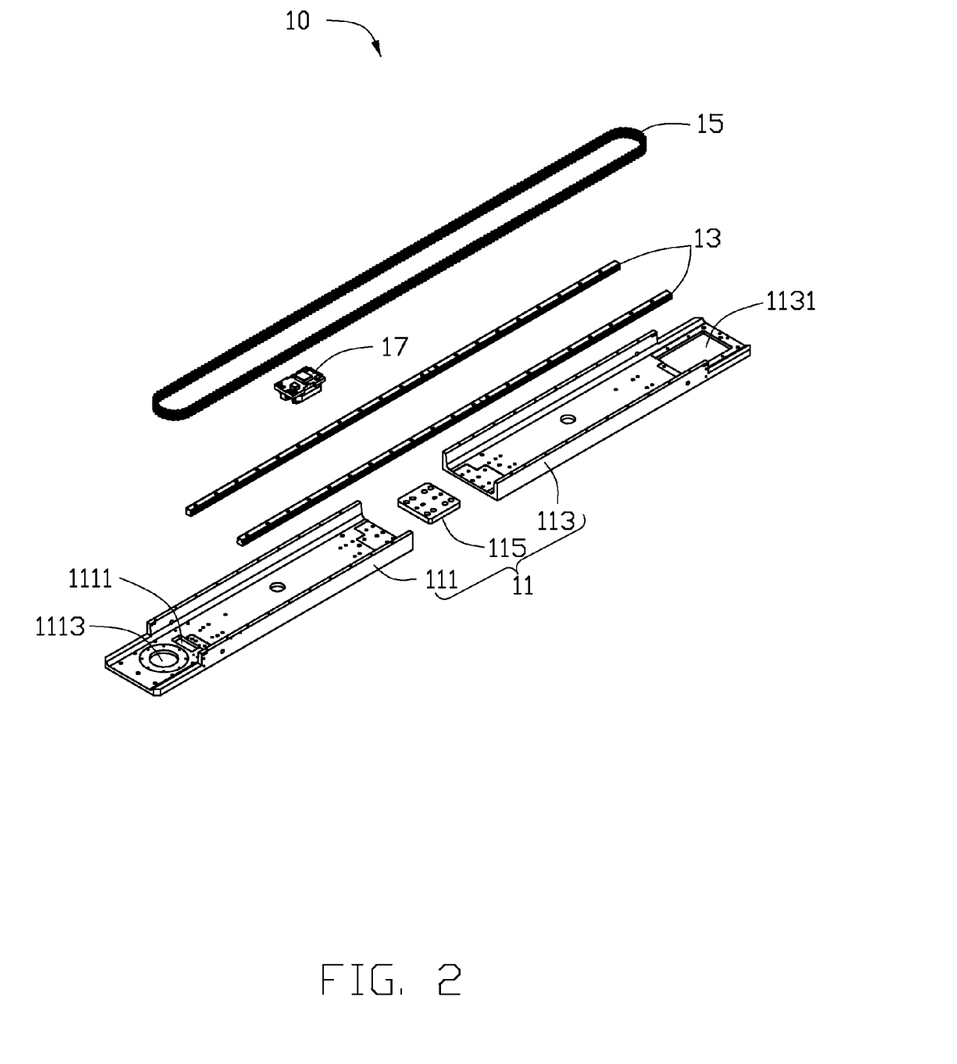
Figure 3:
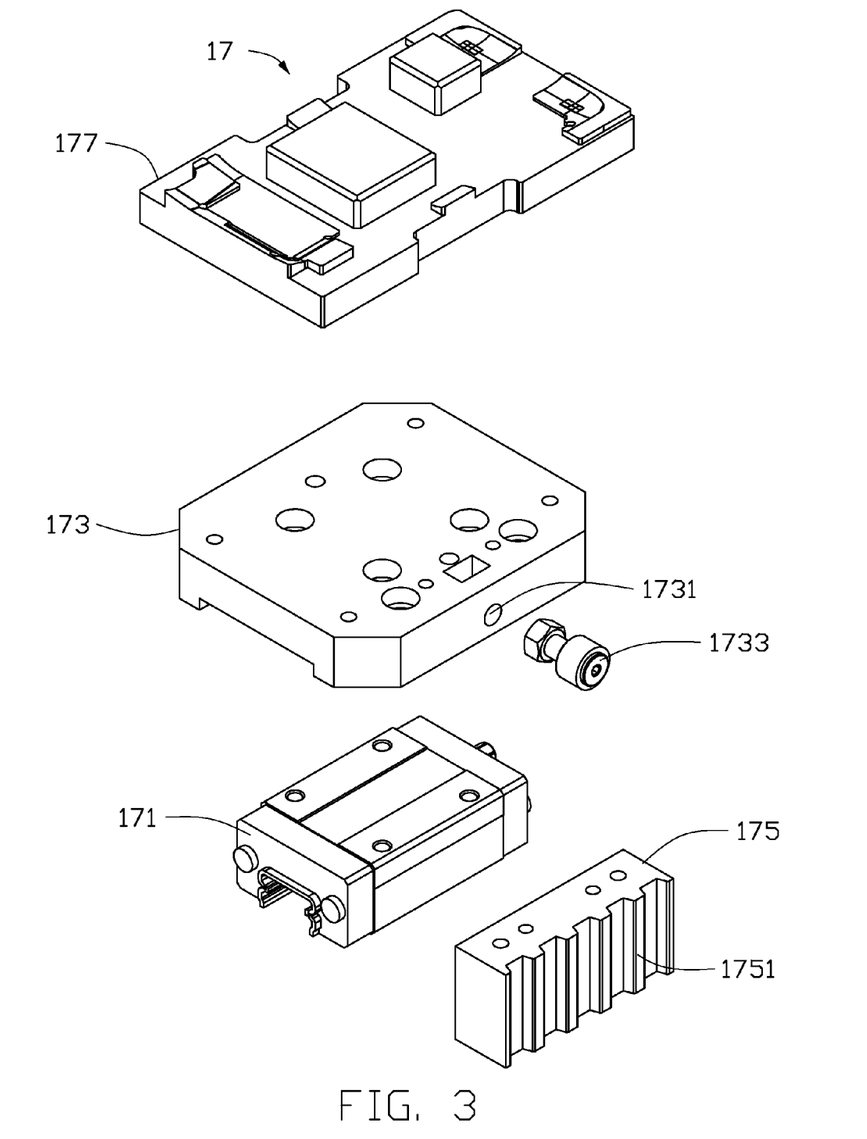
Figure 4:
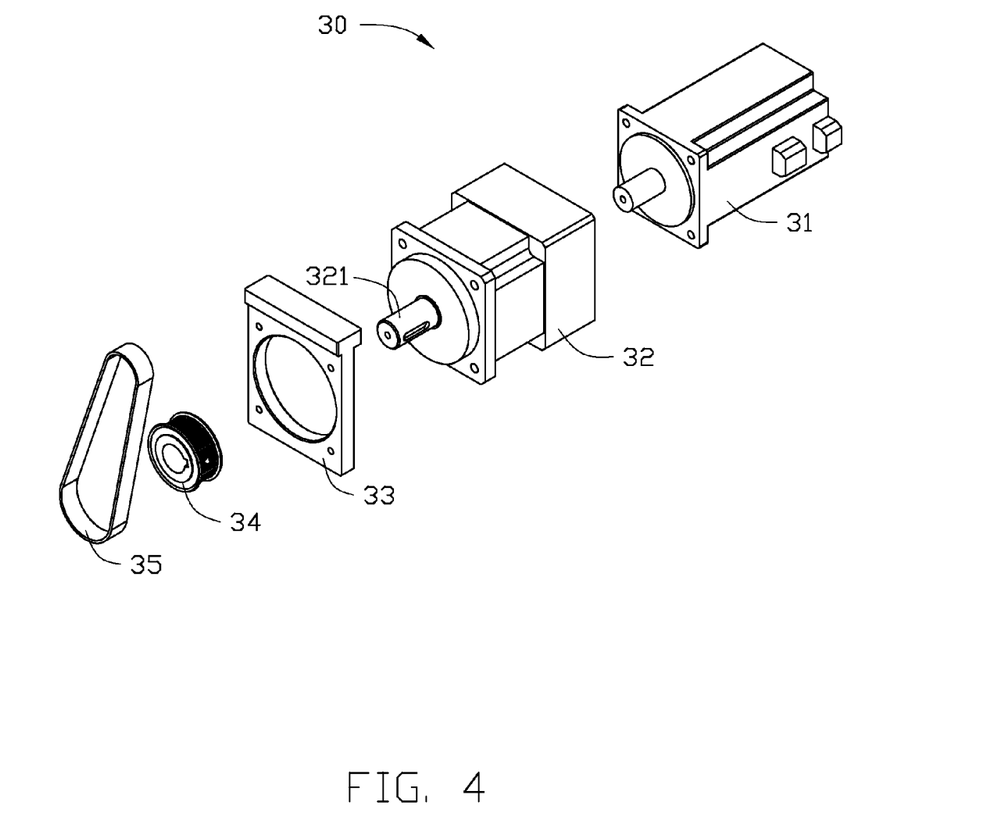
Figure 5:
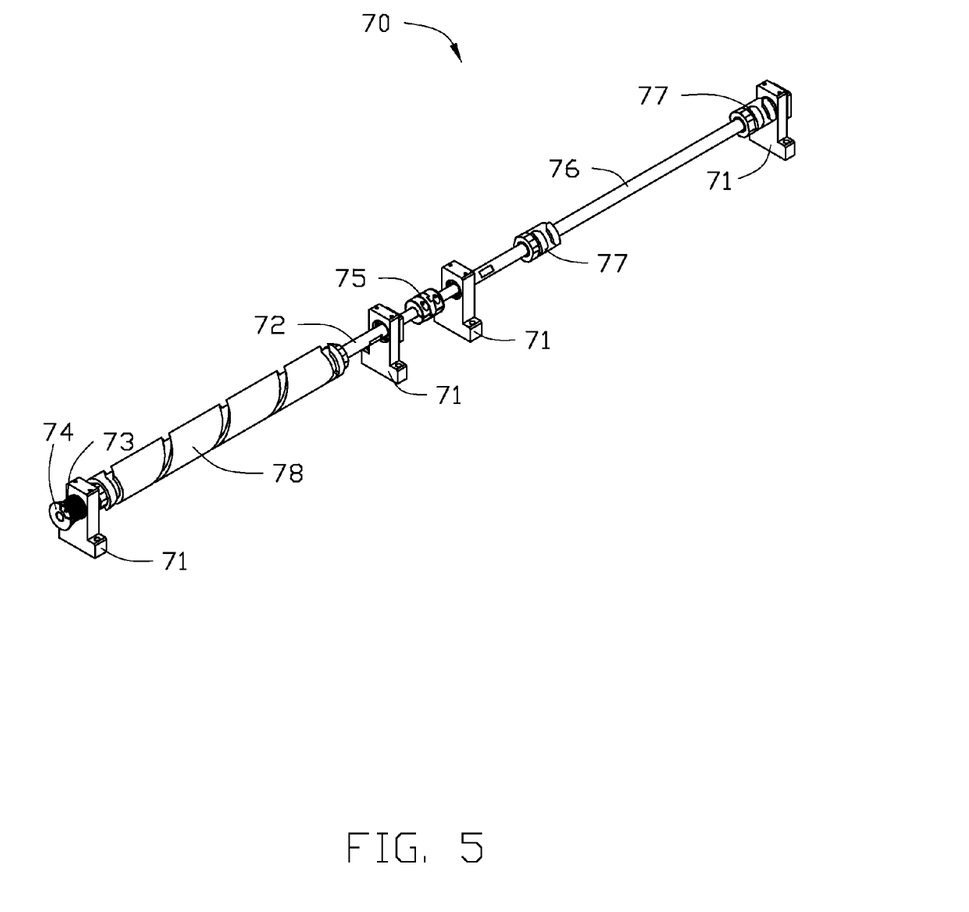
Figure 6:
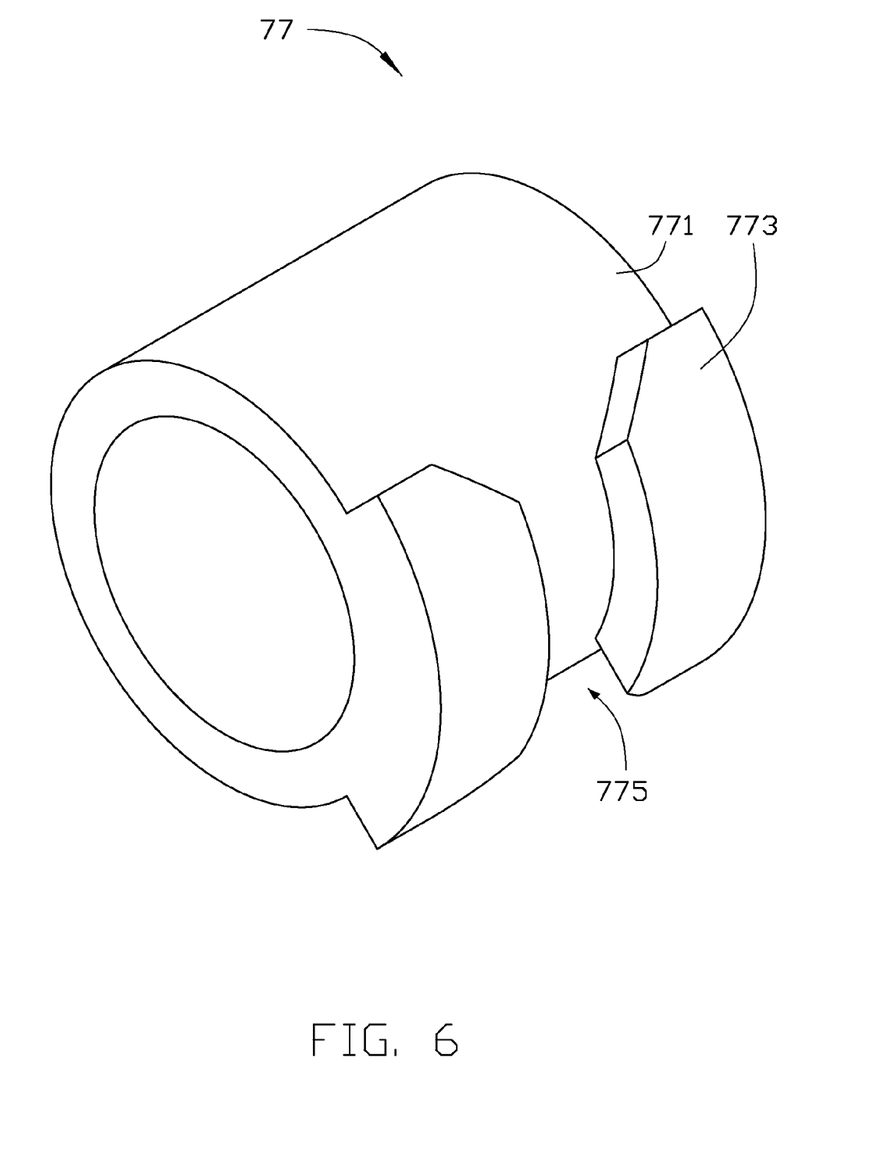

FIG. 6 illustrates the two positioning blocks 77 are substantially hollow structures and are separately sleeved on the positioning rod 76 to secure the sliding members 17. Each positioning block 77 includes a base 771 and two convex blocks 773. The two convex blocks 773 are disposed on the base 771 apart from each other, thereby defining a positioning groove 775 to latch the rolling pole 1733. When the rolling pole 1733 is latched in the positioning groove 775, the sliding member 17 is secured by the positioning block 77.

Figure 7:
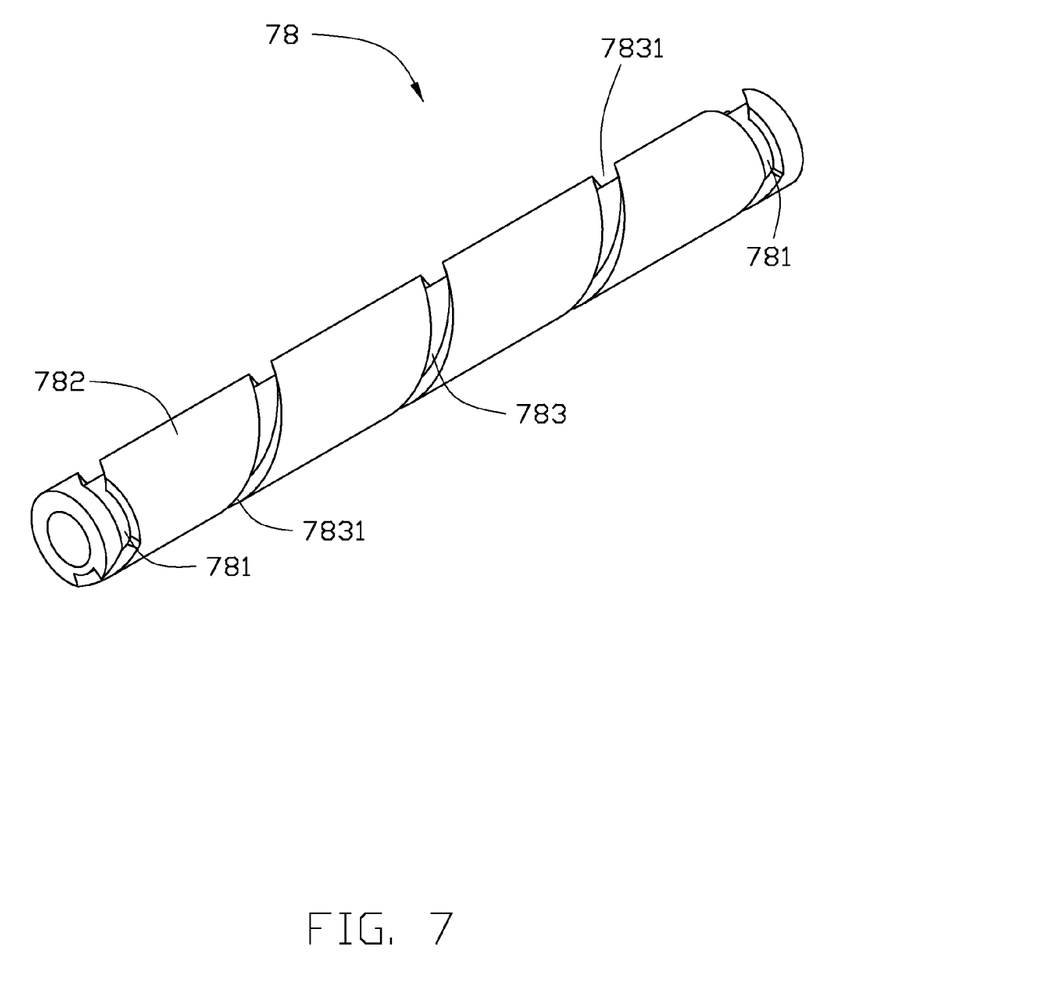

FIG. 7 illustrates the driving rod 78 is a hollow structure and is sleeved on the transmission rod 72 to rotate with the transmission rod 72. Each end of the driving rod 78 defines at least one limiting slot 781, and the driving rod 78 further defines an exterior surface 782 facing away from and parallel to the axis of the driving rod 78. The driving rod 78 haves a spiral slot 783 defined in the exterior surface 782 and located between the at least one limiting slot 781, the spiral slot 783 includes at least one slot end 7831 to communicate with the at least one limiting slot 781. In at least one embodiment, the number of the at least one limiting slot 781 is two, the number of the at least one slot end 7831 is two, and each limiting slot 781 communicates with each end 7831. When the driving rod 78 rotates, the spiral slots 783 rotates with the driving rod 78 to drive the rolling pole 1733 latched with the spiral slots 783 to move, thereby moving the sliding members 17, the gear 1751 engages with the transmission belt 15 to move the transmission belt 15. A part of the limiting slot 781 is elongated, when the two sliding members 17 slide into the two limiting slots 781, the rolling poles 1733 of the sliding members 17 resist the limitation slots 781 to stop the driving rod 78. The sensor 74 is configured to sense whether the transmission rod 72 and the driving rod 78 are stopped, when the transmission rod 72 and the driving rod 78 are stopped, the sensor 74 triggers a control signal to turn off the motor 31, and the transmission belt 15 is stopped without the driving power of the motor 31.

In assembly, the first driving assembly 30 is assembled on the positioning assembly 70, and the first assembly 30 and the positioning assembly 70 are mounted on two sides of the baseboard module 11. The belt 35 of the first driving assembly 30 is connected to the driving wheel 34 of the first driving assembly 30 and the transmission wheel 73 of the positioning assembly 70. The two second driving assemblies 50 are mounted on two opposite ends of the guiding assembly 10 and the transmission belt 15 is fixed around the slave wheel 51. The sliding members 17 of the guiding assembly 10 are slidably disposed on the sliding rails 13 and are engaged with the transmission belt 15, and a rolling pole 173 of a sliding member 17 is accommodated in a spiral slot 783.

FIG. 1 to FIG. 7 illustrate in use, when a workpiece is loaded on the bearing member 177, the motor 31 starts to rotate the driving wheel 34, the belt 35 rotates with the driving wheel and rotates the transmission wheel 73. The slave wheel 73 drives the transmission rod 72 to rotate in order to drive the positioning rod 76 and the driving rod 78 to rotate simultaneously. Then the rolling pole 1733 of one of the sliding members 17 engages the spiral slots 783 to move the other sliding members 17 forward. The gear 1751 of the sliding members 17 engages with the transmission belt 15 to move the transmission belt 15, thereby driving other sliding members 17 on the transmission belt 15 along the transmission belt 15. When two of the sliding members 17 slide into the limiting slots 781 of the driving rod 78, the rolling poles 1733 of the sliding members 17 resist side walls of the limiting slots 781 to stop the transmission rod 72 and the driving rod 78. The motor 31 is turned off in response to the sensor 74. At this moment, the rolling poles 1733 of the other sliding members 17 move into the positioning slots 775 and resist side walls of the positioning slots 775, thus, the sliding members 17 are latched by the positioning slots 775 and limiting slots 781.

In summary, the driving rod 78 defines two limiting slots 781 and spiral slots 783, the positioning block 77 defines a positioning groove 775, the first driving assembly 30 rotates the transmission rod 72, the driving rod 78 and the positioning rod 76, thus the spiral slot 783 engages one of the sliding members 17 to move other sliding members 17 along the belt 15 to the limiting slots 781 and the positioning groove 775, and the workpieces on the sliding members 17 can be positioned by the limiting slots 781 and the positioning groove 775, thereby saving cost and improving work efficiency.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A transmission and positioning mechanism comprising:
   a guiding assembly having:
   two parallel sliding rails;
   a transmission belt loop disposed substantially between the two sliding rails; and
   a plurality of sliding members slidably disposed on the sliding rails;
   a first driving assembly; and
   a positioning assembly connected to the first driving assembly, the positioning assembly having:
   a driving rod defining an exterior surface and a spiral slot defined in the exterior surface and having at least one slot end, and the driving rod having at least one limiting slot communicating with the at least one slot end;

a transmission rod extending coaxially through, and being coupled with the driving rod;

at least one positioning block; and a positioning rod connected to, and rotatable with the transmission rod, the positioning rod extending coaxially through, and being coupled with the at least one positioning block;

wherein, when the first driving assembly rotates the transmission rod and the positioning rod, the spiral slot engages at least one of the plurality of sliding members to move the engaged sliding member to drive the transmission belt to move other sliding members, the at least one limiting slot and the positioning blocks are configured to individually latch the other sliding members; and wherein the sliding member comprises a sliding block and a sliding base, the sliding block is slidably disposed on the sliding rails, the sliding base is fixed on the siding block; the sliding member comprises a gear block and a bearing member, the gear block is mounted on the sliding base and forms a gear to engage with the transmission belt to drive the transmission belt to move, the bearing member is disposed on the sliding base.

2. The transmission and positioning mechanism of claim 1, wherein the positioning block comprises a base and two convex blocks, and the convex blocks are separately disposed on the base to define a positioning groove, the sliding member comprises a rolling pole latched with the positioning groove to secure the sliding member.

3. The transmission and positioning mechanism of claim 2, wherein the sliding base defines a mounting hole, the rolling pole is accommodated in the mounting pole, the rolling pole of one of the sliding members resists the spiral slot to drive the transmission belt and the sliding members to move; the rolling poles of other sliding members are latched by the at least one limiting slot and the positioning slots to secure the other sliding members.

4. The transmission and positioning mechanism of claim 1, wherein the first driving assembly comprises a motor, a connection member, a driving wheel, and a belt, the motor provides a driving power for the first driving assembly, the connection member comprises a rod connected to the motor, the driving wheel is sleeved on the rod, the positioning assembly further comprises a transmission wheel sleeved on the transmission rod, the belt is connected to the driving wheel and the transmission wheel to drive the transmission wheel to rotate by the driving wheel with the driving power of the motor, the transmission wheel drives the transmission rod and the driving rod to rotate.

5. The transmission and positioning mechanism of claim 4, wherein the positioning assembly comprises a sensor sleeved on the transmission rod and located at outside of the transmission wheel, the sensor is configured to sense whether the transmission rod and the driving rod are stopped, when the transmission rod and the driving rod are stopped, the sensor triggers a control signal to the motor to turn off the motor.

6. The transmission and positioning mechanism of claim 4, wherein the guiding assembly further comprises a baseboard module having a first baseboard, a second baseboard and a connection board connected between the first baseboard and the second baseboard, the first baseboard defines a first hole and a second hole, the second baseboard defines a third hole, the belt passes through the first hole to connect to the transmission wheel, the transmission assembly comprises two second driving assemblies installed in the second hole and the third hole.

7. The transmission and positioning mechanism of claim 6, wherein the positioning assembly comprises four bearing blocks, the two bearing blocks are set on the first baseboard and are spaced from each other, and another two bearing blocks are separately set on the second board, the transmission rod is fixed between the two neighboring bearing block on the first baseboard, and the positioning rod is fixed between another two neighboring bearing block on the second baseboard.

8. The transmission and positioning mechanism of claim 1, wherein the positioning assembly further comprises a shaft coupling connecting to the transmission rod and the positioning rod.

9. The transmission and positioning mechanism of claim 1, wherein the two second driving assemblies are mounted on two opposite sides of the guiding assembly, each the second driving assembly comprises a slave wheel, the transmission belt is fixed around the two slave wheels.

* * * * *